Aug. 10, 1926.

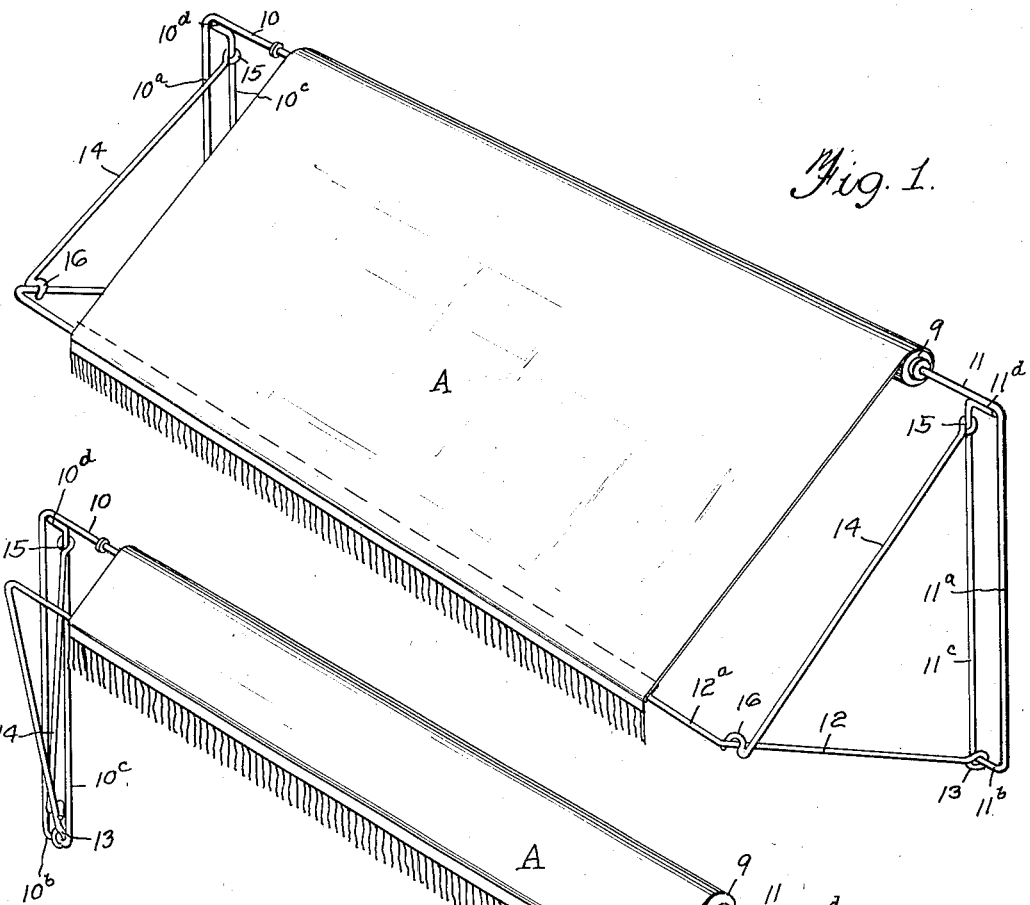
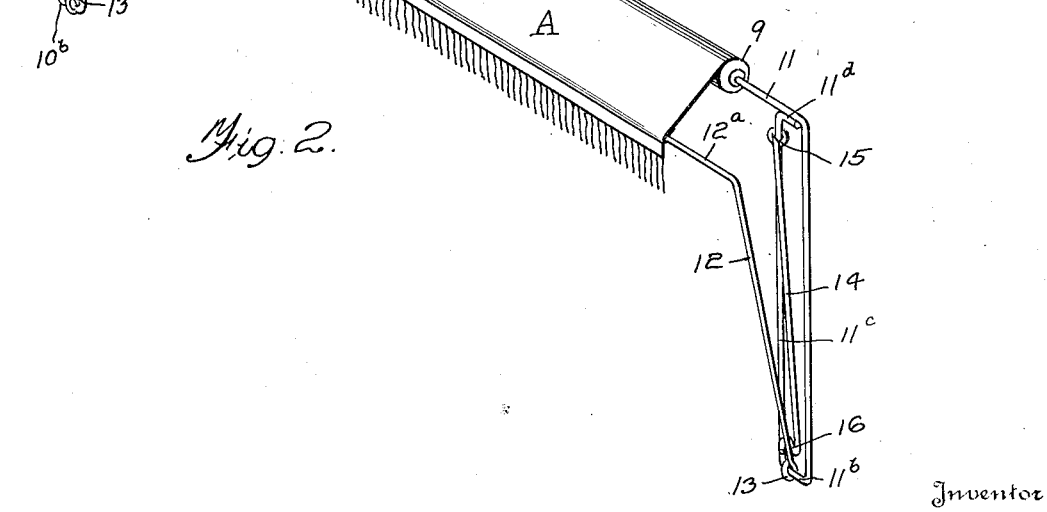

W. R. SPAULDING 1,595,887

AWNING FOR THE SIDE WINDOWS OF CLOSED BODY AUTOMOBILES

Filed Jan. 7, 1926     2 Sheets-Sheet 2

Inventor

William R. Spaulding,

By Shepherd Campbell

Attorney

UNITED STATES PATENT OFFICE.

WILLIAM RUSSELL SPAULDING, OF INDEPENDENCE, KANSAS, ASSIGNOR TO H. M. HURLEY, OF INDEPENDENCE, KANSAS.

AWNING FOR THE SIDE WINDOWS OF CLOSED-BODY AUTOMOBILES.

Application filed January 7, 1926. Serial No. 79,842.

This invention relates to awnings for the side windows of closed body automobiles, such as sedans, coupes and the like.

Broadly stated, the invention resides in providing an awning with a laterally extensible frame, that is adapted to engage and slide in the usual glass-groove of an automobile door or body. More specifically, the invention resides in providing a frame of the character indicated, together with a spring-actuated, self-rolling awning, and means for holding the awning in distended or lowered position.

Further objects and advantages of the invention will be set forth in the detailed description which follows.

In the accompanying drawing:—

Figure 3:
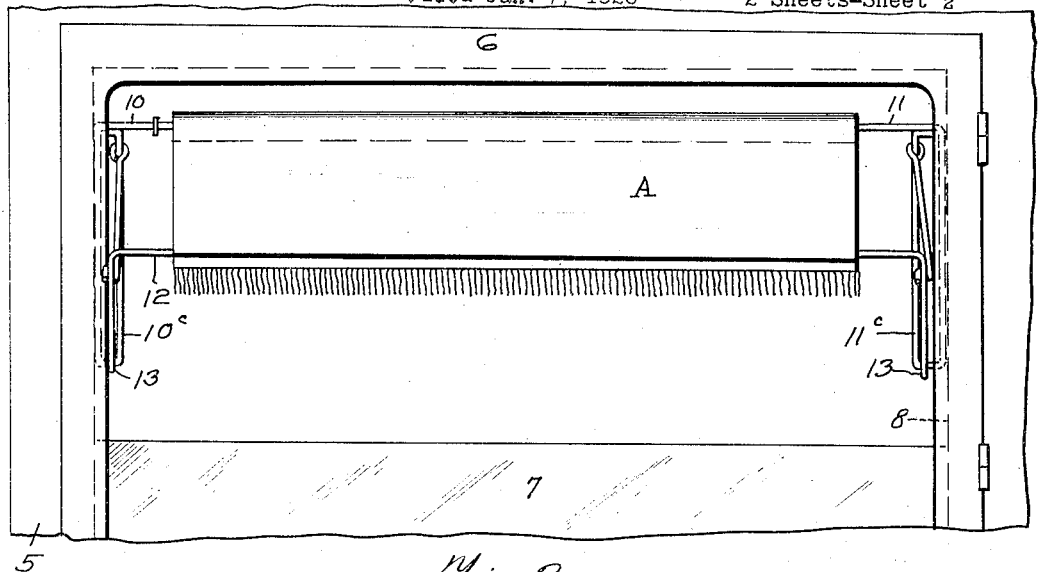
Figure 4:
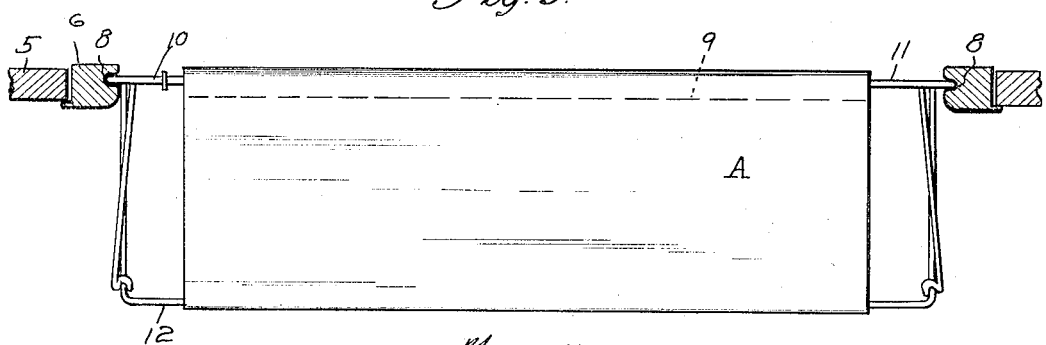
Figure 5:
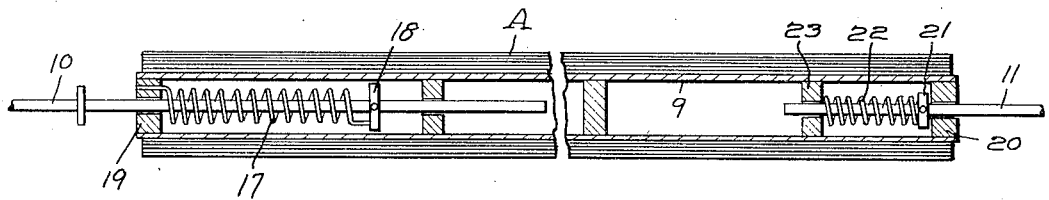

Fig. 1 is a perspective view of an awning constructed in accordance with the invention and showing it in its open or lowered position, Fig. 2 is a perspective view of the awning showing the same in nearly raised or closed position, Fig. 3 is a side elevation of a part of an automobile showing the awning mounted in the glass-grooves of the door of such automobile, Fig. 4 is a horizontal sectional view through the frame of the door of Fig. 3, showing the awning mounted therein, and Fig. 5 is a sectional view through the roller of the awning.

Like numerals designate corresponding parts in all of the figures of the drawings.

In the drawings, 5 designates a part of an automobile body, 6 the frame of the door, and 7 the usual vertically sliding glass, constituting a part of the door. Glass 7 slides in vertical grooves 8 of the frame of the door and, with the glass 7 lowered, I utilize these grooves to receive the frame of the awning of my invention.

Referring now more particularly to Figs. 1 and 2, it will be seen that the awning web A is wound upon a roller 9 and that the said roller is mounted to turn upon the two horizontally disposed stub shaft sections 10 and 11. These stub-shaft sections are bent downwardly at $10^a$, $11^a$, inwardly at $10^b$ and $11^b$ and then upwardly at $10^c$ and $11^c$, their terminal ends being welded to the shaft sections 10 and 11 at $10^d$ and $11^d$. A U-shaped spreader 12 is provided with eyes 13 at its ends, and said eyes are journaled upon the horizontal portions $10^b$ and $11^b$, of the frame sections, (which are constituted by the bent portions of the stub shafts) and the connecting member $12^a$, of said spreader, is engaged with the lower edge of the awning A. Braces 14 are provided with eyes 15, said eyes being slidably mounted upon the members $10^c$ and $11^c$. The braces 14 are provided with hooked ends 16, which are adapted to engage the spreader 12 and hold the awning in lowered or distended position against the tension of a winding spring 17 (see Fig. 5) that is located in the roller 9. One end of the spring 17 is secured to a collar 18 that is fast upon the stub shaft 10, and the other end of this spring engages a plug 19, that is secured to and turns with the roller. When the awning is drawn down to the position illustrated in Fig. 1, the spring is placed under tension and it constantly tends to rotate the roller, to wind the awning to closed position.

The stub-shaft section 11 passes through a plug 20, in the right-hand end of the roller 9. This shaft section is provided with a collar 21, and a spring 22 bears between said collar and a block 23 that is secured to roller 9. Plug 20 and block 23 constitute the means by which the roller is journaled for rotation upon the shaft section 11. However, it is to be noted that this shaft section, and the parts associated therewith, are capable of limited inward movement with respect to the roller. This permits of the ready engagement of the awning frame as a whole in the glass-grooves 8, it being understood that the vertical member $10^a$ may be engaged in the glass-groove, at one side of the doorway, and the vertical member $11^a$, and the parts associated therewith, be thrust inwardly against the tension of the spring 22, to such an extent that said member $11^a$ may be brought into alignment with the glass-groove 8, adjacent thereto. When the shaft section is released, the spring 22 acts to thrust it outwardly and bring about a secure mounting of the awning frame in said glass-grooves. When so mounted, the awning frame may be moved up or down, in said glass-grooves, to whatever position may be best suited to shield the occupant of the automobile from the sun. It will be observed that when the braces 14 are released, and the spring 17 is permitted to act to wind the awning upon the roller 9, the structure is brought to very compact form and may be be readily carried in the luggage compartment of the automobile. The structure is of such a nature that it may be easily and quickly removed if the approach of a storm renders the closing of the glass of the automobile door necessary, while when in place it materially adds to the pleasure and comfort of riding by shielding the occupant of the automobile from the sun when the sun is shining from the side.

It is to be understood that the invention is not limited to the precise construction set forth but that it includes within its purview whatever changes fairly come within either the terms or the spirit of the appended claims.

Having described my invention, what I claim is:—

1. A structure of the character described comprising a spring wound roller, an awning thereon and a supporting mounting for the roller which is longitudinally extensible with respect to said roller, said mounting comprising vertically disposed elongated members of such shape and dimensions as to permit them to enter and slide within the usual glass grooves of an automobile door and engageable in said grooves by the separation of said members longitudinally of the roller.

2. A device of the character described comprising a roller and a two-part frame upon which said roller is journaled, each of said parts comprising a stub-shaft section, and a vertically disposed member, said vertically disposed members being adapted to engage and slide in the usual glass-grooves of an automobile door.

3. A structure as recited in claim 2, in combination with spring means tending to force the two parts of the frame away from each other.

4. A device of the character described, comprising a two-part frame, a spring-actuated roller journaled thereon, an awning web upon said roller, spring means within the roller, tending to force the two parts of the frame apart, a spreader member connected to the free edge of the awning, and hinged to the frame sections, and braces carried by the frame sections and adapted to engage the spreader member.

5. A device of the character described, comprising a two-part frame, a spring-actuated roller journaled thereon, an awning web upon said roller, spring means within the roller, tending to force the two parts of the frame apart, a spreader member connected to the free edge of the awning, and hinged to the frame sections, and braces extending between the spreader section and the frame section.

6. A device of the character described comprising, in combination, a hollow roller, an awning web thereon, a pair of frame sections, each comprising a horizontally disposed stub shaft, and each of said stub shafts being bent at its outer end, first downwardly to constitute a vertical member, then inwardly to constitute a horizontal member, and then upwardly to constitute a second vertical member, a U-shaped spreader member engaged with the lower edge of the awning and having eyes at its ends to engage with the said horizontally bent portions of the frame sections, braces having hooked outer ends adapted to engage the spreader section and having eyes at their inner ends which are slidably engaged with the last named vertical member of the frame sections, a winding spring within the roller, engaged with said roller and with one of the stub-shaft sections, and a compression spring within the roller acting to thrust the other of the stub-shaft sections, outwardly.

7. A device of the character described comprising a hollow roller, a pair of stub-shaft sections upon which said roller is journaled, a winding spring within the roller, engaged with one of the stub-shaft sections and tending to turn said roller, and a compression spring within the roller tending to thrust the other of the stub-shaft sections, outwardly, said stub-shaft sections carrying vertical members adapted to engage in the glass-grooves of an automobile.

8. A structure of the character described comprising a roller, an awning thereon, a supporting mounting for the roller which is extensible longitudinally of the roller and, a spreader for holding the awning in lowered position, said mounting comprising a pair of members having portions of a nature and dimensions to permit them to enter the glass grooves of an automobile door under the said longitudinally extension of the supporting mounting, said members extending such distance below the level of the roller as to provide an extended bearing in the glass grooves and to constitute a point of attachment for the inner ends of the spreader.

9. A structure of the character described comprising an awning web, a horizontal structure constituting a point of attachment for the upper edge of said web, a U-shaped spreader to which the lower edge of the web is attached and vertical members at the outer ends of the horizontal structure extensible with respect to the length of said structure and vertically and downwardly elongated, means hingedly connecting the ends of the spreader to the lower portions of said members, said members comprising portions of a nature and dimensions to permit them to enter the glass grooves of an automobile structure under movement of said members away from each other.

10. A structure as recited in claim 9 in combination with spring means tending to move said members apart.

In testimony whereof I affix my signature.

WILLIAM RUSSELL SPAULDING.